(12) United States Patent  
Tsuchiya et al.

(10) Patent No.: US 10,300,396 B2  
(45) Date of Patent: May 28, 2019

(54) GAME APPARATUS, CONTROLLING METHOD FOR GAME APPARATUS, AND PROGRAM

(71) Applicant: SONY INTERACTIVE ENTERTAINMENT INC., Tokyo (JP)

(72) Inventors: Akitsugu Tsuchiya, Yokohama (JP); Syunsuke Bamba, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 79 days.

(21) Appl. No.: 15/552,908

(22) PCT Filed: Feb. 19, 2016

(86) PCT No.: PCT/JP2016/054945  
§ 371 (c)(1),  
(2) Date: Aug. 23, 2017

(87) PCT Pub. No.: WO2016/136639  
PCT Pub. Date: Sep. 1, 2016

(65) Prior Publication Data  
US 2018/0028921 A1    Feb. 1, 2018

(30) Foreign Application Priority Data  
Feb. 27, 2015   (JP) ................................. 2015-039490

(51) Int. Cl.  
*A63F 13/00*   (2014.01)  
*A63F 13/87*   (2014.01)  
(Continued)

(52) U.S. Cl.  
CPC .............. *A63F 13/87* (2014.09); *A63F 13/25* (2014.09); *A63F 13/30* (2014.09); *A63F 13/52* (2014.09);  
(Continued)

(58) Field of Classification Search  
None  
See application file for complete search history.

(56) References Cited

U.S. PATENT DOCUMENTS

2006/0203009 A1*   9/2006   Nakajima ............... A63F 13/10  
                                                          345/619  
2013/0144956 A1*   6/2013   Sakai .................... H04L 51/046  
                                                          709/206

FOREIGN PATENT DOCUMENTS

JP    H05-250120 A    9/1993  
JP    2008-009573 A   1/2008  
(Continued)

OTHER PUBLICATIONS

English Translation of International Search Report for PCT/JP2016/054945 dated May 17, 2016.

(Continued)

*Primary Examiner* — Paul A D'Agostino  
(74) *Attorney, Agent, or Firm* — Hea Law PLLC

(57) ABSTRACT

A game apparatus is provided which promotes use of a function suitable for a user in response to a usage situation of a function provided in the game apparatus. The game apparatus includes a function usage situation management table for managing a usage situation of a function provided in the game apparatus by a user, a condition decision unit for deciding, in response to the usage situation of the function by the user, whether or not each of a plurality of messages regarding the function stored in an associated relationship with given instructions by the user is to be displayed in response to the corresponding given instruction, and a message display controlling unit for displaying one of the plurality of messages which is decided so as to be displayed in response to the given instruction by the user.

8 Claims, 14 Drawing Sheets

(51) Int. Cl.
 *A63F 13/79* (2014.01)
 *A63F 13/77* (2014.01)
 *A63F 13/25* (2014.01)
 *A63F 13/30* (2014.01)
 *A63F 13/52* (2014.01)
 *A63F 13/533* (2014.01)
 *A63F 13/493* (2014.01)

(52) U.S. Cl.
 CPC ............ *A63F 13/533* (2014.09); *A63F 13/77* (2014.09); *A63F 13/79* (2014.09); *A63F 13/493* (2014.09)

(56) References Cited

FOREIGN PATENT DOCUMENTS

| | | |
|---|---|---|
| JP | 2010-108032 A | 5/2010 |
| JP | 2014-164599 A | 9/2014 |

OTHER PUBLICATIONS

PS4 Hatsubai Countdown Event Kaisaichu no New York de "inFAMOUS:Second Son" o Asondekita! SCE Yoshida san eno Interview mo Keisai, [online], Nov. 15, 2013 (Nov. 15, 2013), Dengeki Online, [retrieval date Apr. 26, 2016 (Apr. 26, 2016)],Internet<URL: http://dengekionline.com/elem/000/000/752/752931/>; Cited in the ISR.

When You Don't Want Your Laptop to Go to Sleep, [online], Jul. 28, 2011, PCWorld, [retrieval date Apr. 26, 2016 (Apr. 26, 2016)], Internet<URL:http://www.pcworld.com/article/231154/laptop_sleep.html>; Cited in the ISR.

Office Action of Apr. 17, 2018, for corresponding JP application No. 2017-502335 acting as concise explanation of previously submitted reference(s) and English translation thereof.

English Translation of Written Opinion of the International Searching Authority for PCT/JP2016/054945 accompanied with PCT/IB/373 and PCT/IB/338 dated Sep. 8, 2017, acting as concise explanation of previously submitted references.

* cited by examiner

F I G . 2
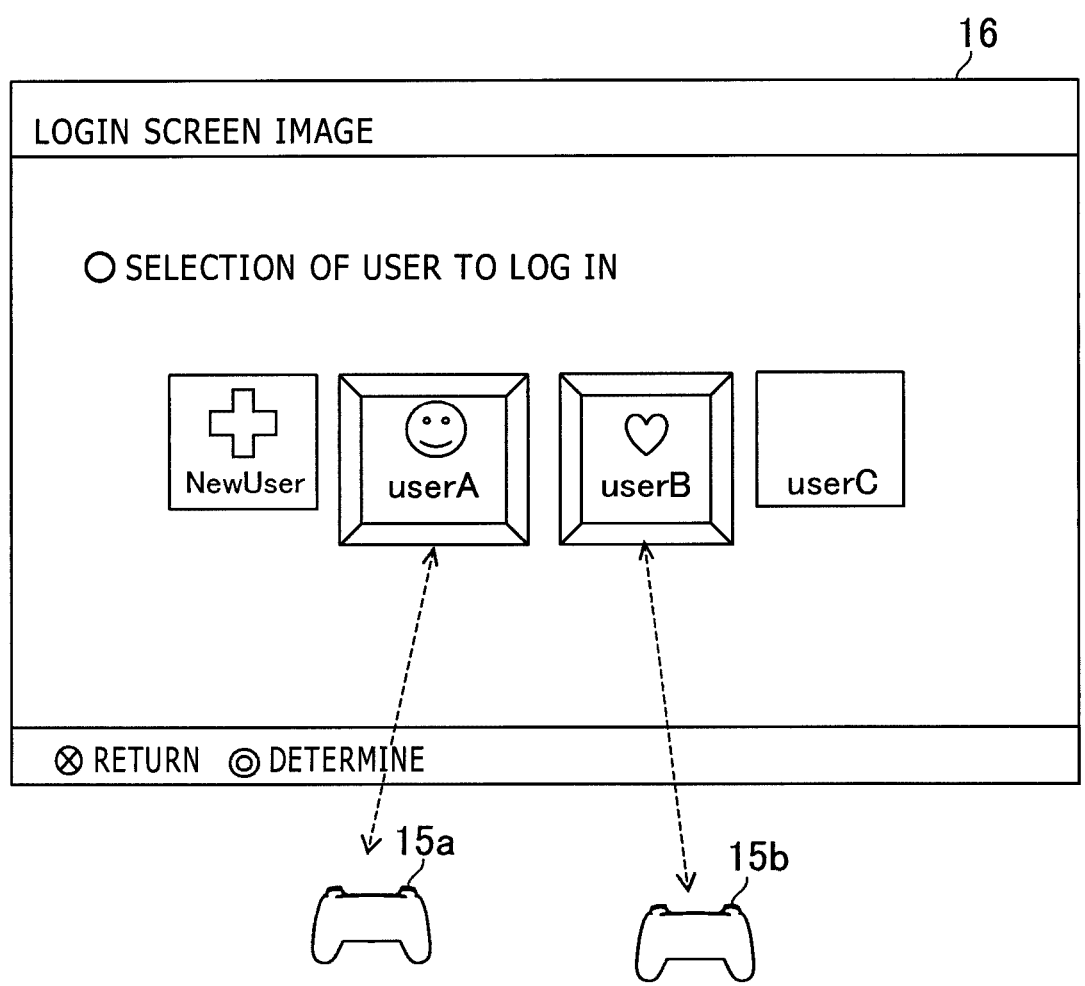

FIG.5

Tbl100

| ID | DISPLAYING CONTENTS X (FOR MESSAGE IMAGE) | DISPLAYING CONTENTS Y (FOR MESSAGE LIST) | DISPLAYING TIMING CONDITION | FUNCTION USE CONDITION | TRANSITION DESTINATION LINK |
|---|---|---|---|---|---|
| M0 | MessageX0 | MessageY0 | T1 | USE CONDITION 0-1<br>USE CONDITION 0-2 | SCREEN IMAGE 0 |
| M1 | MessageX1 | MessageY1 | T1 | USE CONDITION 1-1<br>USE CONDITION 1-2 | SCREEN IMAGE 1 |
| M2 | MessageX2 | MessageY2 | T1 | USE CONDITION 2 | SCREEN IMAGE 2 |
| M3 | MessageX3 | MessageY3 | T1 | USE CONDITION 3-1<br>USE CONDITION 3-2 | SCREEN IMAGE 3 |
| M4 | MessageX4 | MessageY4 | T2 | USE CONDITION 4 | SCREEN IMAGE 4 |
| M5 | MessageX5 | MessageY5 | T1 | USE CONDITION 5 | SCREEN IMAGE 5 |
| M6 | MessageX6 | MessageY6 | T1 | USE CONDITION 6 | SCREEN IMAGE 6 |
|  |  |  |  |  |  |

FIG.6

| USER IDENTIFIER | FUNCTION 1 | FUNCTION 2 | FUNCTION 3 | FUNCTION 4 | FUNCTION 5 |
|---|---|---|---|---|---|
| userA | ○ | ○ | — | ○ | 2 |
| userB | ○ | × | — | × | 1 |
| userC | × | ○ | — | ○ | 0 |

Tbl200

F I G . 8

Tbl300

| ID | DISPLAYING CONTENTS X (FOR MESSAGE IMAGE) | TIMING CONDITION | DISPLAYING CONTENTS Y (FOR MESSAGE LIST) | DATE AND TIME | DISPLAYING FLAG |
|---|---|---|---|---|---|
| que1 | MessageX6 | T1 | MessageY1 | 2015/4/11 18:16 | READ ALREADY |
| que2 | MessageX4 | T2 | MessageY4 | 2015/4/11 20:02 | |
| que3 | MessageX1 | T1 | MessageY6 | 2015/4/11 20:30 | |
| que4 | MessageX3 | T1 | MessageY3 | 2015/4/12 10:56 | |
| que5 | MessageX6 | T1 | MessageY1 | 2015/4/12 11:24 | |
| | | | | | |

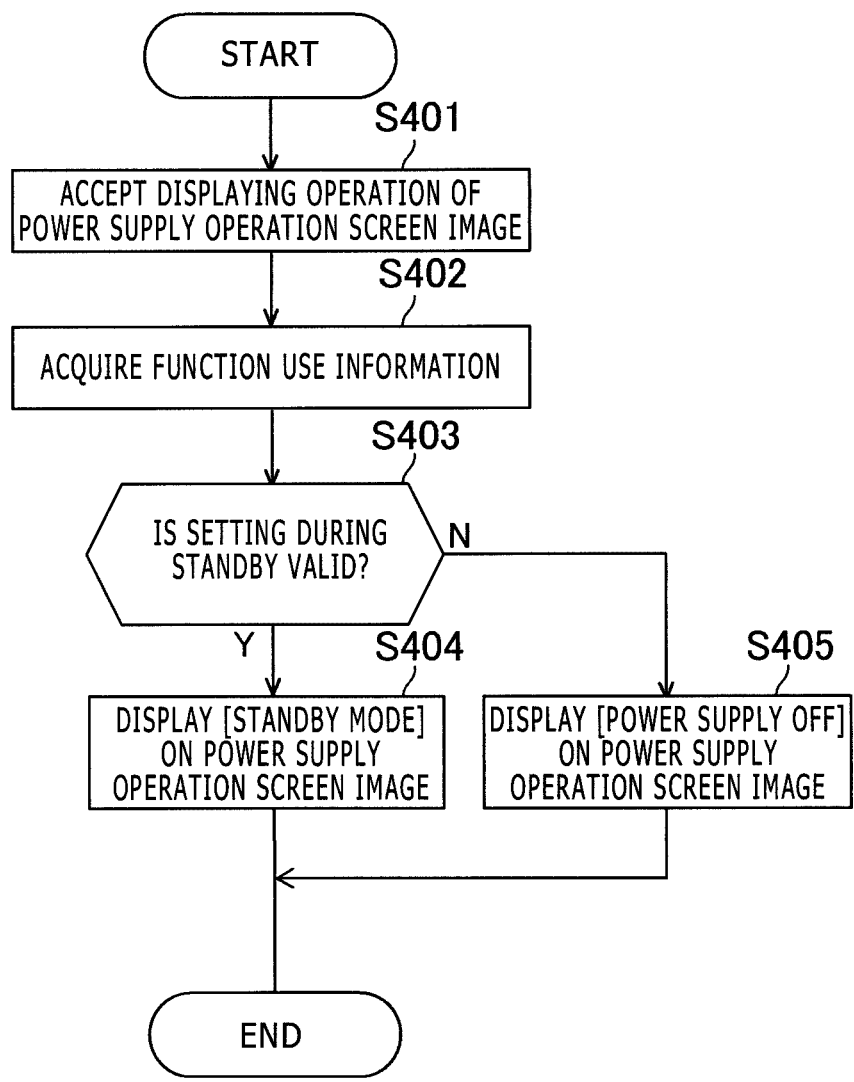

GAME APPARATUS, CONTROLLING METHOD FOR GAME APPARATUS, AND PROGRAM

CROSS REFERENCE TO RELATED APPLICATIONS

This application is a National Stage of International Application No. PCT/JP2016/054945 filed on Feb. 19, 2016, which claims priority from Japanese Patent Application 2015-039490, filed on Feb. 27, 2015. The contents of the above documents are incorporated herein by reference in their entirety.

TECHNICAL FIELD

The present invention relates to a game apparatus, a controlling method for a game apparatus and a program.

BACKGROUND ART

A game apparatus is known in which information relating to a function added by update is presented as update information.

SUMMARY

Technical Problem

Various functions are provided in a game apparatus, and a usage situation of a function differs depending upon a user who utilizes the game apparatus. Accordingly, only to present information relating to the added function causes, depending upon a user, the information to include information unnecessary or to include information relating to a function used already, and information suitable for the user is not always be presented.

The present invention has been made in view of such a circumstance as described above, and it is one of objects of the present invention to provide a game apparatus that promotes use of a function suitable for a user in response to a usage situation of a function provided in the game apparatus.

Further, it is another one of objects of the present invention to provide, as a power supply function that is one of functions frequently used in a game apparatus, a power supply function that corresponds to a usage situation of a function by the user and is easy to use.

Solution to Problem

In order to solve the problem described above, a game apparatus according to the present invention includes management means for managing a usage situation of a function provided in the game apparatus by a user, decision means for deciding, in response to the usage situation of the function by the user, whether or not each of a plurality of messages regarding the function stored in an associated relationship with given instructions by the user is to be displayed in response to the corresponding given instruction, and message display controlling means for causing one of the plurality of messages, which are decided so as to be displayed, to be displayed in response to the given instruction by the user.

The game apparatus may be configured such that, when the decision unit decides that the function stored in an associated relationship with the given instruction is not used, the message display controlling means causes a message regarding the function to be displayed in response to the given instruction by the user.

The game apparatus may be configured such that the message display controlling means causes, from among the plurality of messages decided as to be displayed in response to the given instruction by the user, one of the messages that have not been displayed in response to the next given instruction by the user, to be displayed.

The game apparatus may further includes message list production means for producing a message list in which the plurality of messages decided so as to be displayed in response to the given instruction by the user by the decision unit are placed, and message list displaying means for displaying a message list image indicating the message list in accordance with an instruction by the user.

The game apparatus may be configured such that the message list production means places the messages in an order in which the decision means decides to display the messages in response to the given instruction by the user.

The game apparatus may further include transition screen image displaying controlling means for displaying, in response to selection indication of one of the displayed messages by the user, a transition screen image in which information regarding a function indicated by the message is indicated.

The game apparatus may be configured such that the management means manages a usage situation of a function provided in the game apparatus for each of a plurality of users who use the game apparatus, and the decision means decides, in response to a usage situation of the function corresponding to the user, whether or not a message relating to the function stored in an associated relationship with a given instruction by the user is to be displayed in response to the given instruction.

In order to solve the problem described hereinabove, according to the present invention, a game apparatus includes power supply operation screen image displaying means for displaying a power supply operation screen image including an operation image for placing a power supply into a standby state or an off state, and acquisition means for acquiring information indicating a setting situation of a function that is usable when the power supply is in the standby state, wherein, in response to the setting situation of the function usable in the standby state, the power supply operation screen image displaying means causes the power supply operation screen image to include the operation image for placing the power supply into a standby state or the operation image for placing the power supply into an off state.

Further, according to the present invention, a controlling method for a game apparatus includes power supply operation screen image displaying means for displaying a power supply operation screen image including an operation image for placing a power supply into a standby state or an off state, and acquisition means for acquiring information indicating a setting situation of a function that is usable when the power supply is in the standby state; wherein, in response to the setting situation of the function usable in the standby state, the power supply operation screen image displaying means causes the power supply operation screen image to include the operation image for placing the power supply into a standby state or the operation image for placing the power supply into an off state.

Further, according to the present invention, a program for causing a game apparatus to function as power supply operation screen image displaying means for displaying a power supply operation screen image including an operation image for placing a power supply into a standby state or an off state, and acquisition means for acquiring information indicating a setting situation of a function that is usable when the power supply is in the standby state is configured such that the program causes, in response to the setting situation of the function usable in the standby state, the power supply operation screen image displaying means to cause the power supply operation screen image to include the operation image for placing the power supply into a standby state or the operation image for placing the power supply into an off state. The program may be stored in a computer-readable information storage medium.

Further, according to the present invention, a controlling method for a game apparatus includes management means for managing a usage situation of a function provided in the game apparatus by a user, decision means for deciding, in response to the usage situation of the function by the user, whether or not each of a plurality of messages regarding the function stored in an associated relationship with given instructions by the user is to be displayed in response to the corresponding given instruction, and message display controlling means for causing one of the plurality of messages, which are decided so as to be displayed, to be displayed in response to the given instruction by the user.

According to the present invention, a program causes a game apparatus to function as management means for managing a usage situation of a function provided in the game apparatus by a user, decision means for deciding, in response to the usage situation of the function by the user, whether or not each of a plurality of messages regarding the function stored in an associated relationship with given instructions by the user is to be displayed in response to the corresponding given instruction, and message display controlling means for causing one of the plurality of messages, which are decided so as to be displayed, to be displayed in response to the given instruction by the user. The program may be stored in a computer-readable information storage medium.

BRIEF DESCRIPTION OF DRAWINGS

FIG. 2 is a view depicting an example of a utilization situation of the game apparatus utilized by a plurality of users according to the embodiment.

FIG. 5 is a view illustrating an example of a message information table stored in a storage unit of the game apparatus according to the embodiment.

FIG. 6 is a view illustrating an example of a function usage situation management table stored in the storage unit of the game apparatus according to the embodiment.

FIG. 8 is a view illustrating an example of a message list according to the embodiment.

FIG. 17 is a flow chart illustrating an example of a power supply function setting screen displaying process executed by the game apparatus according to the embodiment.

DESCRIPTION OF EMBODIMENT

Figure 1:
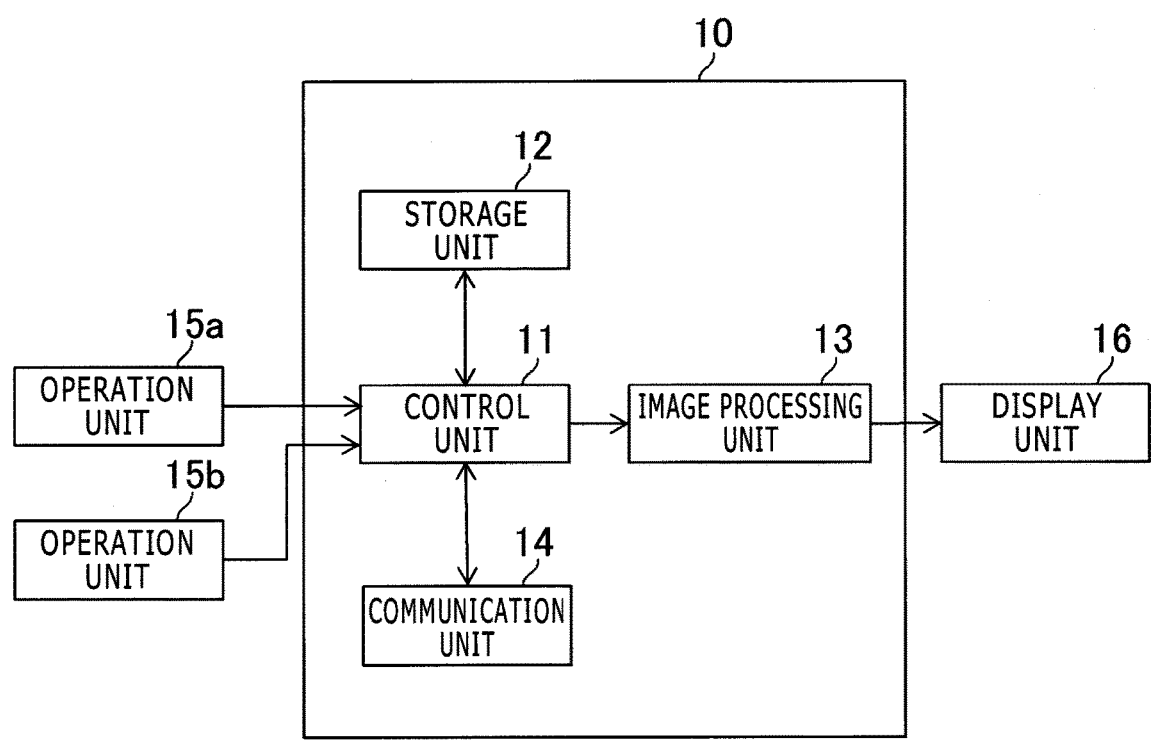
FIG. 1 is a block diagram depicting an example of a general configuration of a game apparatus according to an embodiment.

In the following, an embodiment of the present invention is described in detail with reference to the drawings.
Message Displaying Process FIG. 1 is a block diagram depicting an example of a general configuration of a game apparatus 10 according to the present embodiment. The game apparatus 10 is an information processing apparatus that is used by a user when the user plays games or watches moving pictures, and may be a home game machine, a portable game machine, a personal computer or the like. As depicted in FIG. 1, the game apparatus 10 according to the present embodiment is configured by including a control unit 11, a storage unit 12, an image processing unit 13 and a communication unit 14. Further, the game apparatus 10 is connected to an operation unit 15a, an operation unit 15b and a display unit 16.

The control unit 11 includes a program controlling device such as a central processing unit (CPU) and executes various information processes in accordance with a program stored in the storage unit 12. The storage unit 12 is configured by including a memory element such as a random access memory (RAM) or a read only memory (ROM) and stores a program to be executed by the control unit 11 and data that is a target to be processed by the program. Further, the storage unit 12 functions also as a work memory of the control unit 11.

The image processing unit 13 is configured by including, for example, a graphics processing unit (GPU) and a frame buffer memory, and renders an image to be displayed on a screen of the display unit 16 in accordance with a rendering instruction outputted from the control unit 11. As a particular example, the image processing unit 13 includes a frame buffer memory corresponding to the screen of the display unit 16, and the GPU writes an image into the frame buffer memory after every predetermined interval of time in accordance with an instruction from the control unit 11. The image written in the frame buffer memory is then converted into a video signal at a predetermined timing and is displayed on the screen of the display unit 16.

The communication unit 14 is an interface for transmission and reception of data to and from some other apparatus through a communication network. The game apparatus 10 performs transmission and reception of information to and from some other apparatus through the communication unit 14.

The operation units 15a and 15b are devices for accepting an operation input from the user, and may each be, for example, a keyboard, a mouse, a controller for a home game machine or the like. Further, the operation units 15a and 15b may each include an operation member such as an operation button or a switch provided on the housing surface of the game apparatus 10. The user inputs various instructions to the game apparatus 10 by perform an operation for the operation unit 15a or the operation unit 15b.

The display unit 16 is a display apparatus such as a home television receiver or a liquid crystal display unit and displays an image in response to a video signal outputted from the image processing unit 13.

In the present embodiment, the game apparatus 10 includes various functions and can use an arbitrary one of the functions by selective setting by the user. In particular, the game apparatus 10 includes such functions that "voice operation," "share play with a friend," "system software can be automatically updated in a standby mode," "standby mode can be used in a state in which an application is temporarily kept being interrupted" and so forth. Since the functions can be used if the user places setting of the function into a valid state, it is considered that, depending upon the user, there is a function that is not used yet or another function whose existence is even unknown. In the present embodiment, a message for announcing existence of a function suitable for a user is displayed in response to a usage situation of the function by the user. Consequently, utilization of a function that is not used yet by the user or another function whose existence is even unknown is promoted.

Further, in the present embodiment, a plurality of users utilize the same game apparatus 10. Each of the users can utilize the game apparatus 10 by producing an individual account and logging in. FIG. 2 is a view depicting an example of a utilization situation of the game apparatus 10 that is utilized by a plurality of users according to the present embodiment. FIG. 2 depicts an example of a login screen image displayed on the display unit 16 when the game apparatus 10 is activated. In such a login screen image as depicted, a user A who is to operate the operation unit 15a can log in by selecting an image indicating an own account "userA," and, at this time, the account "userA" is associated with the operation unit 15a. In other words, the operator of the operation unit 15a is associated as the user A. Thereafter, an operation instruction outputted from the operation unit 15a is processed as information corresponding to the account "userA." Further, a user B who is to operate the operation unit 15b on the same login screen image can log in by selecting an image indicating an own account "userB," and the account "userB" is associated with the operation unit 15b. In particular, the operator of the operation unit 15b is associated as the user B. Thereafter, it is processed that an operation instruction outputted from the operation unit 15b is information corresponding to the account "userB." In this manner, the game apparatus 10 can specify the user of the operator from information for specifying the operation unit 15.

Figure 3:
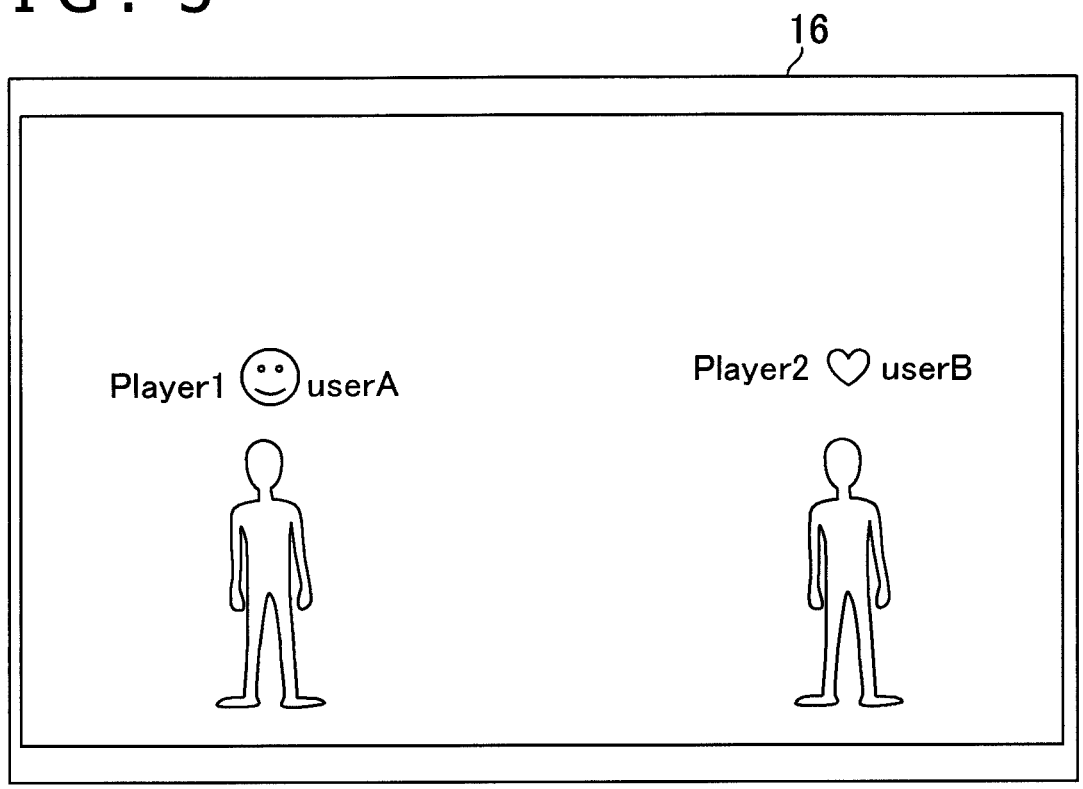
FIG. 3 is a view depicting an example of a game screen when a plurality of users play a game together using the game apparatus.

Further, in the present embodiment, a plurality of users can play a game together in a state in which each of the users logs in with its own account. FIG. 3 is a view depicting an example of a game screen image when a plurality of users play a game together using the same game apparatus 10. Here, the user A who operates the operation unit 15a and the user B who operates the operation unit 15b play a game together. As illustrated in FIG. 3, an in-game character Player1 of the user A and an in-game character Player2 of the user B are displayed on a screen image that indicates game contents displayed on the display unit 16. The in-game character Player1 can be operated by the operation unit 15a that is operated by the user A while the Player2 can be operated by the operation unit 15b that is operated by the user B. At this time, game information of a game progress situation of each user and so forth is recorded in an associated relationship with an individual account. In particular, even if a plurality of users individually operate their own characters at the same time on the same game apparatus 10, various information is managed for each account.

Similarly, since also setting of functions included in the game apparatus 10 is managed for each user and each account, a usage situation of the functions included in the game apparatus 10 differs among different users. Therefore, the game apparatus 10 utilized by a plurality of users is configured such that information regarding a function suitable for each user can be presented in response to a usage situation of functions by the each user.

Figure 4:
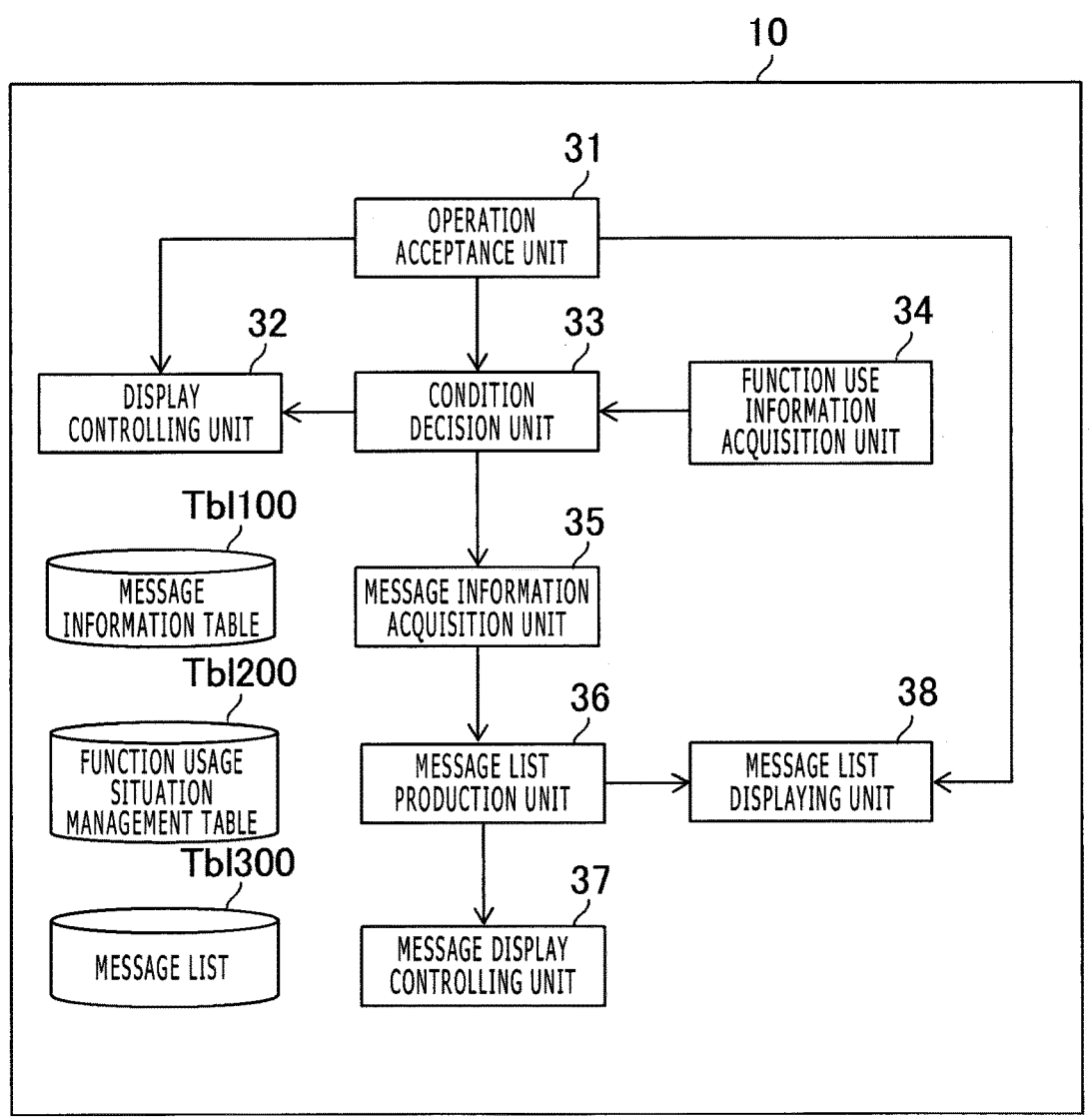
FIG. 4 is a functional block diagram depicting an example of functions implemented by the game apparatus according to the embodiment.

Function implemented by the game apparatus 10 in the present embodiment are described below. FIG. 4 is a functional block diagram depicting an example of functions implemented by the game apparatus 10 according to the present embodiment. As depicted in FIG. 4, the game apparatus 10 is functionally configured by including an operation acceptance unit 31, a display controlling unit 32, a condition decision unit 33, a function use information acquisition unit 34, a message information acquisition unit 35, a message list production unit 36, a message display controlling unit 37, a message list displaying unit 38, a message information table Tbl100, a function usage situation management table Tbl200 and a message list Tbl300. From among these functions, the operation acceptance unit 31, the display controlling unit 32, the function use information acquisition unit 34, the condition decision unit 33, the message information acquisition unit 35, the message display controlling unit 37, the message list production unit 36 and the message list displaying unit 38 are implemented by the control unit 11 executing a program stored in the storage unit 12. The program may be provided in a state in which it is placed into various computer-readable information storage media such as, for example, an optical disk or may be provided through a communication network such as the Internet. Further, the message information table Tbl100, the function usage situation management table Tbl200 are implemented by the storage unit 12.

In the present embodiment, it is assumed that information of a message capable of being displayed is stored in advance in the storage unit 12. FIG. 5 is a view depicting an example of the message information table Tbl100 stored in the storage unit 12 of the game apparatus 10. As depicted in FIG. 5, in the message information table Tbl100, displaying contents X, displaying contents Y, a displaying timing condition, a function use condition and transition destination link after a message indication operation are associated with each other. The message information table Tbl100 is information common to each user who utilizes the game apparatus 10. The displaying contents X are a message for announcing a function provided in the game apparatus 10 to the users and are a message to be reflected on a message image. The displaying contents Y are a message for announcing a function provided in the game apparatus 10 to the user and are a message to be reflected on a message list image. It is to be noted that the displaying contents X and the displaying contents Y may have the same contents. The displaying timing condition indicates a displaying timing at which a message image on which the displaying contents X is reflected is to be displayed, and is, for example, a timing at which the user is to log in, another timing at which a home screen image is to be displayed, a further timing at which activation or deactivation of a predetermined application is to be performed or the like. Each of the timings is associated with an operation instruction accepted by the operation acceptance unit 31, and information of the timing is obtained in accordance with an operation instruction accepted by the operation acceptance unit 31. While the function use condition principally indicates a usage situation of a function for displaying a message image, conditions of a number of times by which a predetermined operation is executed, a timing at which a predetermined operation is executed and so forth are sometimes included. One or more use conditions are associated as function use conditions with each piece of massage information, if all of associated use conditions are satisfied, it is decided that the function use condition is satisfied. The transition destination link indicates a screen image to be displayed when a displayed message image is selectively indicated by the user, and the displayed message image is a screen image on which setting of a function indicated by the displaying contents X or the displaying contents Y can be performed. Alternatively, the transition destination link may be a screen image illustrating details of the function indicated by the displaying contents X or the displaying contents Y.

In the present embodiment, since displaying contents displayed as a message image promote use of a function to a user, it is effective to announce a function the user does not use. Accordingly, as the function use condition, it is a condition principally that the user does not use the function yet, namely, setting of the function is invalid. In particular, for example, with message information M6 included in the message information table Tbl100, with displaying contents X and displaying contents Y, Message6: "application can be temporarily kept being interrupted during standby" is associated; with a displaying timing condition, T1: "upon displaying of home screen image for the first time after login" is associated; with a function use condition, a use condition 6: "setting of 'application is temporarily kept being interrupted' is invalid" is associated; and with a transition destination link, a screen image 6: "setting screen image of function during standby" is associated. At this time, if the setting of 'application is temporarily kept being interrupted' is invalid at a timing at which a home screen image is displayed after login of a user, a message image indicating "application can be temporarily kept being interrupted during standby" is displayed. Then, if the message image is selectively indicated by the user, a setting screen image on which setting of the function during standby can be performed is displayed. By announcing a function not used yet by a user and making it possible to immediately present a screen image on which the function can be set valid in such a manner as described above, it is facilitated for the user to use a new function.

Further, in the present embodiment, the game apparatus 10 manages a usage situation of the functions relating to each of a plurality of users who utilize the game apparatus 10. FIG. 6 is a view illustrating an example of the function usage situation management table Tbl200 stored in the storage unit 12 of the game apparatus 10. As illustrated in FIG. 6, in the function usage situation table, a usage situation of each of the functions provided in the game apparatus 10 is managed for each of user identifiers that indicate users who utilize the game apparatus 10. Here, a case in which the function is set valid, another case in which the function is set invalid and a further case in which use of the function is not permitted are indicated by "○," "x," and "-," respectively. Further, not only whether setting of the function is valid/invalid but also count information of a number of times by which a predetermined operation is executed or the like may be managed. Further, although all of the functions included in the game apparatus 10 may be managed in the function usage situation management table Tbl200, a function used for each use condition included in the function usage situation management table Tbl200 may be managed.

The operation acceptance unit 31 accepts an instruction operation of the user for an operation member provided in a controller.

The display controlling unit 32 controls the display unit 16 to display an image corresponding to an instruction operation accepted by the operation acceptance unit 31. For example, when the operation acceptance unit 31 accepts an instruction operation for displaying a home screen image, the display controlling unit 32 controls the display unit 16 to display a home screen image of the user who outputs the instruction operation.

The function use information acquisition unit 34 acquires function use information indicative of a usage situation of various functions corresponding to the user who utilizes the game apparatus 10 from the function usage situation management table Tbl200.

The condition decision unit 33 decides whether or not a message image is to be displayed on the display unit 16 in response to an instruction operation accepted by the operation acceptance unit 31 based on information indicated by the instruction operation accepted by the operation acceptance unit 31 and function use information acquired by the function use information acquisition unit 34. In particular, the condition decision unit 33 decides whether or not a displaying timing indicated by the instruction operation accepted by the operation acceptance unit 31 satisfies a predetermined displaying timing condition. Further, the condition decision unit 33 decides whether or not a predetermined function use condition is satisfied from the usage situation of the functions indicated by the function use information. The condition decision unit 33 decides whether or not a message image is to be displayed in response to whether or not the predetermined timing condition and the predetermined function use condition are satisfied.

The message information acquisition unit 35 acquires, from the message information table Tbl100, message information when it is decided by the condition decision unit 33 that the displaying timing condition and the function use condition are satisfied.

The message list production unit 36 places the message information acquired by the message information acquisition unit 35 in accordance with an acquisition order into the message list Tbl300. It is to be noted that, where there are a plurality of pieces of message information acquired at a time by the message information acquisition unit 35, the message information may be placed into the message list Tbl300 in accordance with an order in which it is placed into the message information table Tbl100.

The message display controlling unit 37 controls the display unit 16 to display a message image indicated by the displaying contents X (for a message image) included in the message information acquired by the message information acquisition unit 35. The message image displayed through the message display controlling unit 37 is displayed in an overlapping relationship with an image displayed through the display controlling unit 32. Further, the message display controlling unit 37 may select one of pieces of message information placed into the message list Tbl300 and control the display unit 16 to display a message image indicated by displaying contents included in the message information.

When the operation acceptance unit 31 accepts an instruction operation for displaying the message list Tbl300, the message list displaying unit 38 displays a message list image indicating the message list Tbl300 on the display unit 16.

Figure 7:
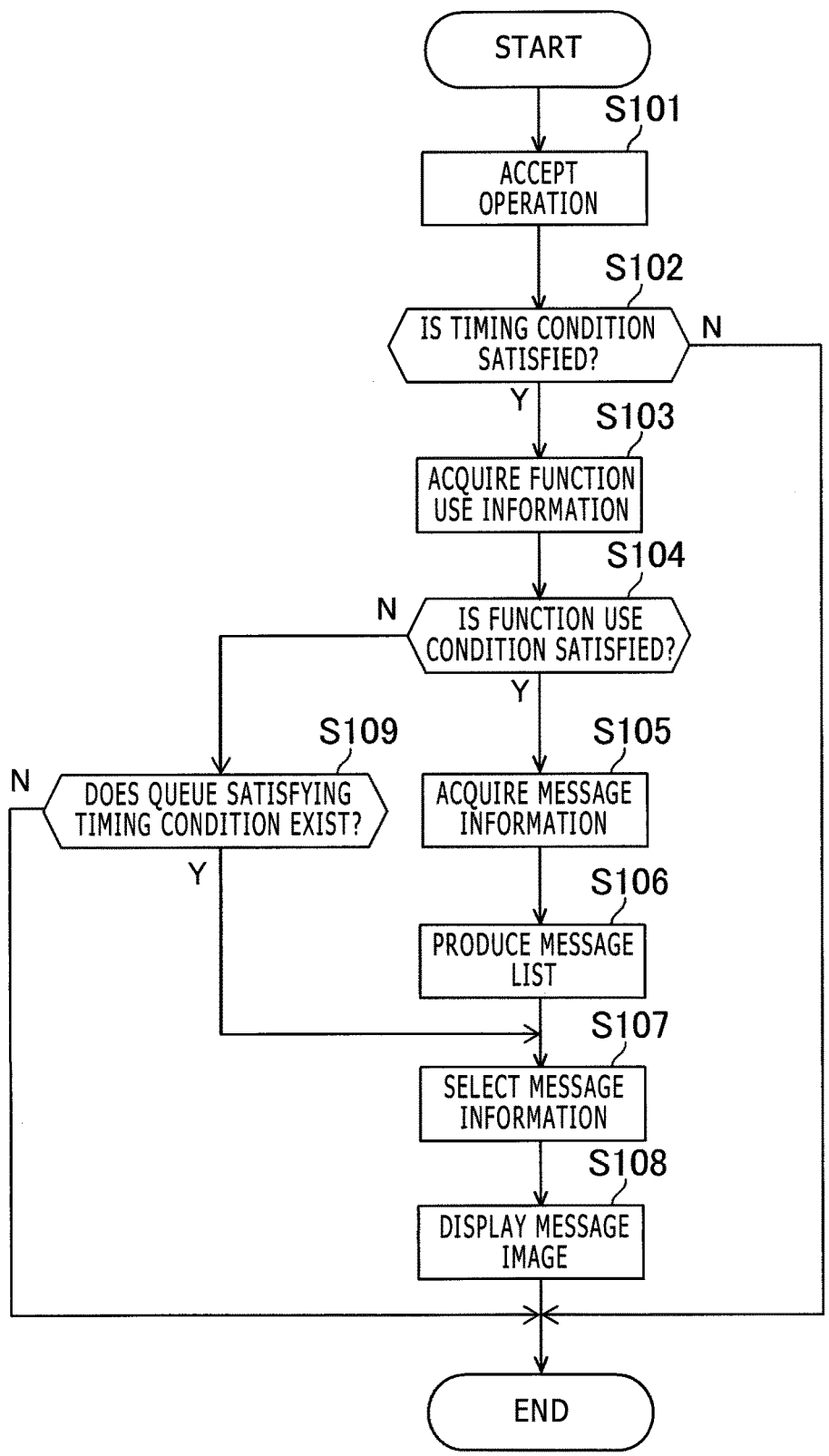
FIG. 7 is a flow chart illustrating an example of a message image displaying process executed by the game apparatus according to the embodiment.

Here, a message image displaying process executed by the game apparatus 10 according to the present embodiment is described with reference to a flow chart of FIG. 7.

First, the operation acceptance unit 31 accepts an operation instruction from the operation unit 15a (S101). Here, it is assumed that a user identifier of a user who operates the operation unit 15a is included in the operation instruction. Then, the condition decision unit 33 decides whether or not a displaying timing indicated by the operation instruction accepted by the operation acceptance unit 31 satisfies one of displaying timing conditions included in the message information table Tbl100 (S102).

If it is decided as a result of the decision in the process S102 that one of displaying timing conditions included in the message information table Tbl100 is satisfied, the function use information acquisition unit 34 acquires function use information corresponding to a user identifier included in the operation instruction accepted by the operation acceptance unit 31 from a function usage situation table (S103). For example, if the user identifier (for example, "userA") indicating a user A is included in the operation instruction accepted from the operation unit 15a, the function use information acquisition unit 34 acquires function use information corresponding to "userA" from the function usage situation table.

Then, the condition decision unit 33 decides whether or not a function use condition included in the message information table Tbl100 is satisfied from a usage situation of functions indicated by the function use information acquired by the function use information acquisition unit 34 (S104).

If it is decided as a result of the decision in the process S104 that there is message information satisfying the function use condition (S104: Y), the message information acquisition unit 35 acquires message information satisfying the displaying timing condition and the function use condition from the message information table Tbl100 (S105). Then, the message list production unit 36 places a queue into which displaying contents X (for a message image) included in the message information, displaying contents Y (for a message list) and displaying timing condition acquired by the message information acquisition unit 35 and the acquisition date and time of the message information are associated with each other to produce a message list Tbl300 (S106).

FIG. 8 is a view illustrating an example of the message list Tbl300 according to the present embodiment. As depicted in FIG. 8, the queue in which the displaying contents X, the displaying contents Y and the displaying timing condition from within the message information acquired by the message information acquisition unit 35 and the acquisition date and time of the message information are associated with each other is placed into an acquisition order. That is, the queue is placed at the lower side as the acquisition date and time of the message information becomes new. Basically, a message image is displayed in order from a queue in which acquisition date and time of the message information is old. Further, a displaying flag indicating whether or not a message image is displayed is associated with each queue, and a flag (for example, "already read") is made for a queue corresponding to a message image displayed through the message display controlling unit 37. It is to be noted that, where there are a plurality of pieces of message information acquired at the same timing, the message list production unit 36 may place the plurality of pieces of message information into the message list Tbl300 in accordance with a placement order in the message information table Tbl100, or may associate a priority degree with the plurality of pieces of message information such that the message information is placed into the message list Tbl300 in a descending order of the priority degree.

Then, the message display controlling unit 37 selects one of the pieces of message information acquired by the message information acquisition unit 35 (S107), and controls the display unit 16 to display a message image indicating the displaying contents X (for a message image) included in the selected message information (S108). If the message image is displayed on the display unit 16, the message image displaying process is ended. Here, if a queue is placed already into the message list Tbl300, the message display controlling unit 37 selects a queue whose the displaying timing condition coincides with the displaying timing indicated by the operation instruction accepted by the operation acceptance unit 31 and besides the acquisition date and time is oldest from among queues that are included in the message list Tbl300 and in which an "already read" flag is not made, and a message image indicating the displaying contents X (for message image) included in the current queue is displayed on the display unit 16. In this manner, by selecting and displaying one of pieces of message information in accordance with the order of the acquisition date and time or the order of the priority degree of the message information, a message that corresponds to a usage situation of a function by the user and in which the priority degree is highest can be presented to the user.

On the other hand, if it is decided as a result of the decision in the process S104 that there is no message information satisfying the function use condition (S104: N), the condition decision unit 33 decides whether or not there is a queue whose displaying timing condition coincides with the displaying timing indicated by the operation instruction accepted by the operation acceptance unit 31 from among the queues that are included in the message list Tbl300 and in which a no "already read" flag is made (S109).

If it is decided as a result of the decision in the process S109 that there is a queue whose displaying timing condition coincides with the displaying timing indicated by the operation instruction accepted by the operation acceptance unit 31, the processes at and after the process S107 are executed. On the other hand, if it is decided as a result of the decision in the process S109 that there is no queue whose displaying timing condition coincides with the displaying timing indicated by the operation instruction accepted by the operation acceptance unit 31, the message image displaying process is ended.

Further, if it is decided as a result of the decision in the process S102 that any of the displaying timing conditions included in the message information table Tbl100 is not satisfied, the message image displaying process is ended.

Figure 9:
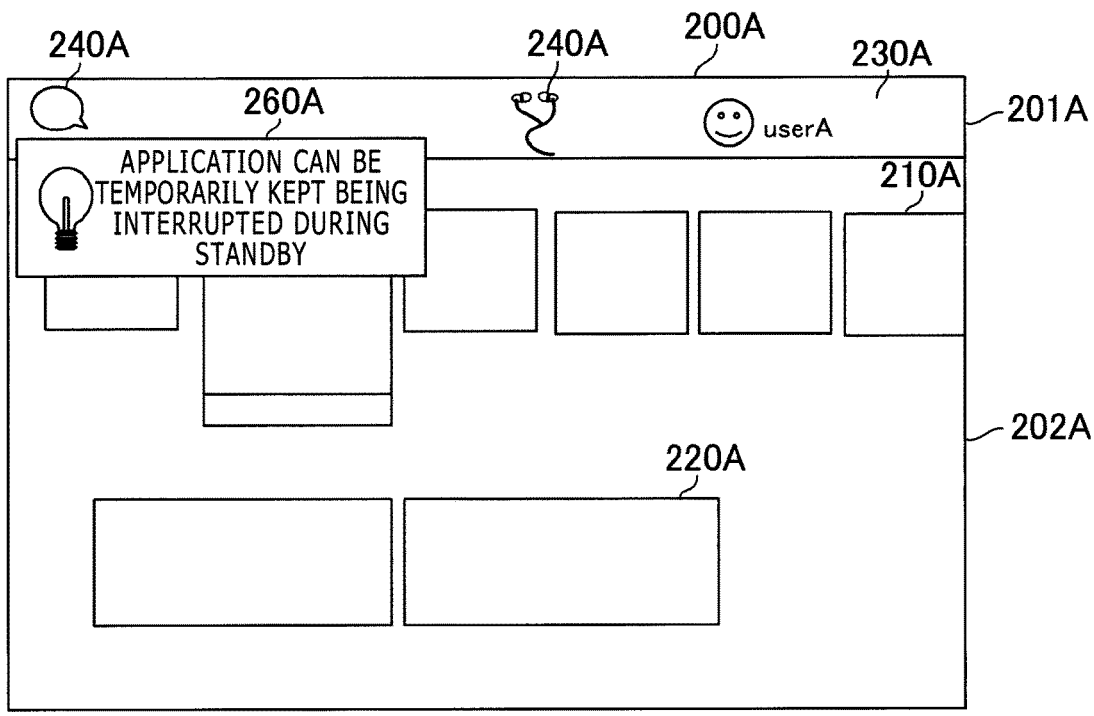
FIG. 9 is a view depicting an example of a message image displayed on a display unit according to the embodiment.
Figure 10:
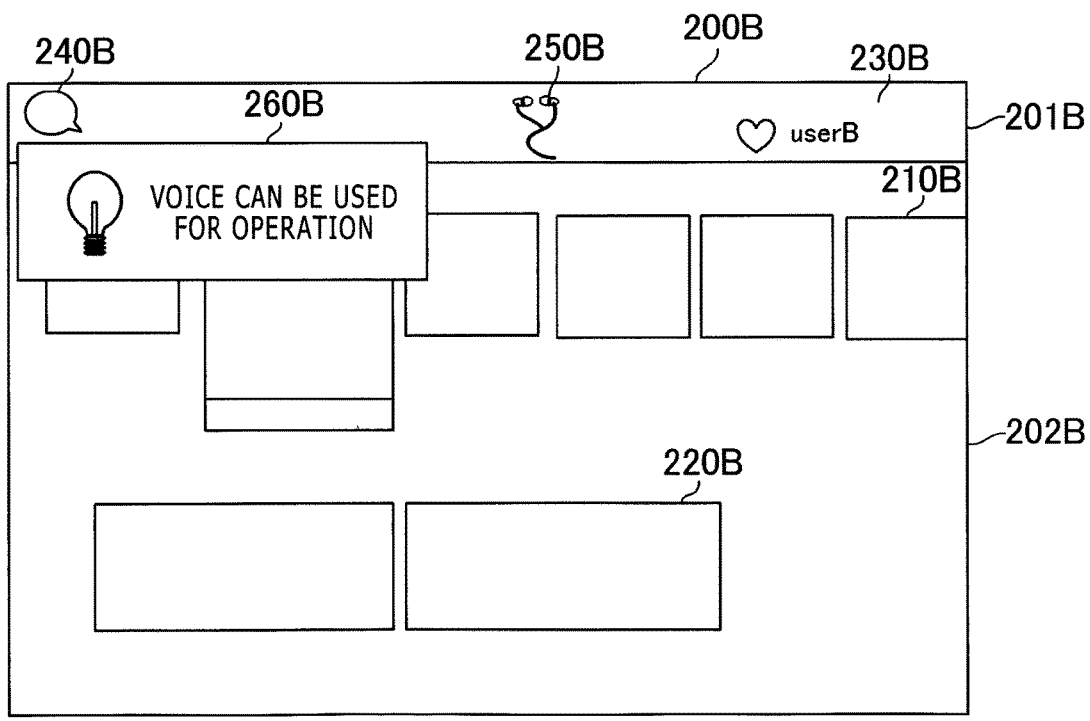
FIG. 10 is a view depicting an example of a message image displayed on the display unit according to the embodiment.

FIG. 9 and FIG. 10 are views depicting an example of message images displayed on the display unit 16 according to the present embodiment. FIG. 9 depicts an example of a message image displayed at a timing at which a top screen image is displayed in response to a top screen displaying instruction from the user A. A top screen image 200A is a screen image generated for each of users (here, a screen image corresponding to the user A), and is configured by including, for example, a function region 201A and a main region 202A. In the function region 201A, a user identification icon 230A indicating a user who performs an operation, an announcement icon 240A indicating that there is an announcement to the user, a function icon 250B indicating a function being used and so forth are displayed. In the main region 202A, an activation image 210A for activating various applications, an execution history image 220A of the applications and so forth are displayed. The top screen image 200A is displayed through the display controlling unit 32 by accepting a top screen displaying instruction by the operation acceptance unit 31. A message 260A displayed together with such a top screen image 200A as just described is displayed in an overlapping relationship with the top screen image 200A, and the displaying contents X (for a message image) included in the message information are reflected. From the message image 260A, the user can know part of functions provided in the game apparatus 10. Further, the message image 260A can be selectively indicated, and a setting screen image for setting a function indicated by the message image 260A is displayed by selectively indicating the message image 260A by the user. Here, a screen image of a transition destination link associated with the message information table Tbl100 is displayed. Consequently, when the user views the message image 260A and wants to use a function, the user can save the labor for searching the setting screen image. It is to be noted that the message image 260A may be kept displayed as it is during displaying of the top screen image 200A or may be erased after a predetermined time elapses. For example, "application can be temporarily kept being interrupted during standby" for introducing part of functions capable of being executed during standby of the game apparatus 10 is displayed on the message image 260A displayed on the top screen image 200A of the user A.

On the other hand, FIG. 10 depicts an example of a message image displayed at a timing at which a top screen image is displayed in accordance with a top screen displaying instruction from the user B. While the configuration of a top screen image is similar to that of the user A depicted in FIG. 9, displaying contents correspond to the user B. A top screen image 200B is configured by including, for example, a function region 201B and a main region 202B. In the function region 201B, a user identification icon 230B indicating a user who performs an operation, an announcement icon 240B indicating that there is an announcement for the user, a function icon 250B indicating a function being used and so forth are displayed. In the main region 202B, an activation image 210B for activating various applications, an execution history image 220B of an application and so forth are displayed. As depicted in FIG. 10, displaying contents of a message image 260B displayed on the top screen image 200B of the user B indicate "voice can be used for operation" for introducing part of operation functions of the game apparatus 10, and are different from those of the message image 260A displayed in the top screen image 200A of the user A.

As depicted in FIG. 9 and FIG. 10, a message image displayed on the top screen images of the user A and user B who use the same game apparatus 10 corresponds to a usage situation of the function of each user. Further, by displaying one message image in the top screen image of each user, it is easy for the user to recognize a message whose priority degree is highest to the user. On the other hand, depending upon the user, there are circumstances that all messages to be displayed are demanded to be confirmed. Therefore, the present embodiment includes also a configuration by which all messages to be displayed can be displayed as a message list image in accordance with an instruction of the user.

Figure 11:
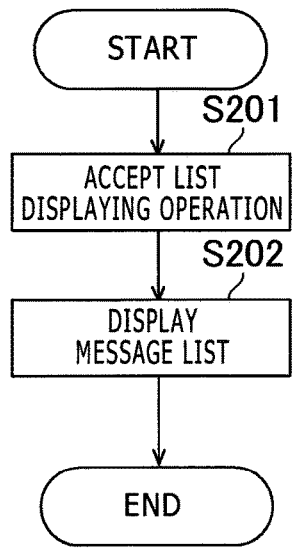
FIG. 11 is a flow chart illustrating an example of a message list image displaying process executed by the game apparatus according to the embodiment.

Now, a message list image displaying process executed by the game apparatus 10 according to the present embodiment is described with reference to a flow chart of FIG. 11.

If the operation acceptance unit 31 accepts an operation instruction for displaying a message list image (S201), the message list displaying unit 38 displays a message list image indicating the message list Tbl300 on the display unit 16 (S202), and the message list image displaying process is ended.

Figure 12:
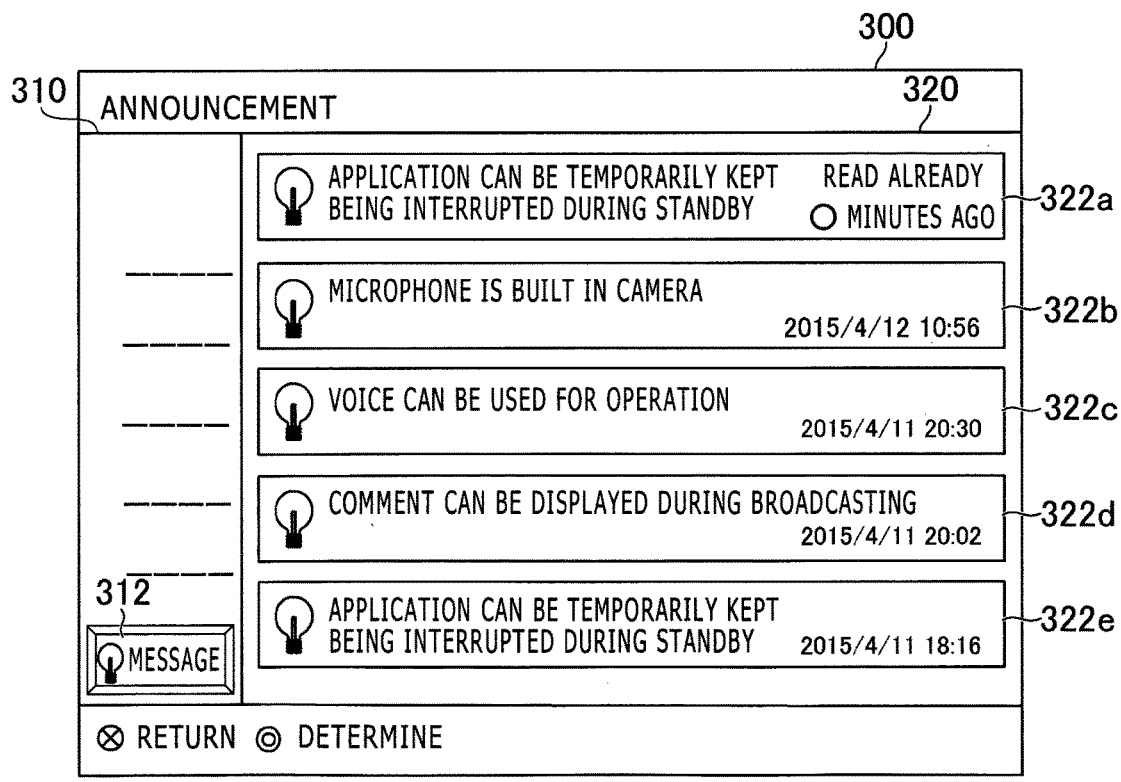
FIG. 12 is a view depicting an example of a message list image displayed on the display unit according to the embodiment.

FIG. 12 is a view depicting an example of a message list image displayed on the display unit 16 according to the present embodiment. As depicted in FIG. 12, a message list image is displayed in an information displaying region 320 in an announcement screen image 300 that includes an announcement item region 310 and the information displaying region 320. It is to be noted that the announcement screen image 300 is displayed by selectively indicating the announcement icon 240A included in the function region 201A in the top screen image 200A depicted in FIG. 9. Further, by selectively indicating a message item 312 included in the announcement item region 310, the operation acceptance unit 31 accepts an operation instruction for displaying a message list image and the message list displaying unit 38 displays the message list image in the information displaying region 320. Actually, the message list image entirely has a vertically elongated shape or a horizontally elongated shape, and part of a displaying range of the message list image is displayed in the information displaying region. Further, by performing a predetermined operation such as a scroll operation by the user for the information displaying region, the displaying range can be moved. Consequently, an arbitrary list item 322 included in the message list image can be displayed in the information displaying region.

The message list image depicted in FIG. 12 is an image on which the message list Tbl300 depicted in FIG. 8 is reflected, and list items 322 (in FIGS. 12, 322a to 322e) in which information indicating displaying contents Y (for a message list), an acquisition date and time and a displaying flag included in the message list Tbl300 is displayed are displayed in order of the acquisition date and time. In the message list image, a list item 322 having a newer acquisition date and time is displayed at an upper position. It is to be noted here that, while an example is depicted in which information indicating the displaying contents Y (for a message list), an acquisition date and time and a displaying flag is included in the list item 322, the present invention is not limited to this example. If an acquisition order can be recognized, the acquisition date and time may not be displayed. Further, the list items 322 can be selectively indicated by the user, and, if the user selectively indicates one of the list items 322, a screen image of a transition destination link associated with the message information table Tbl100 is displayed.

Figure 13:
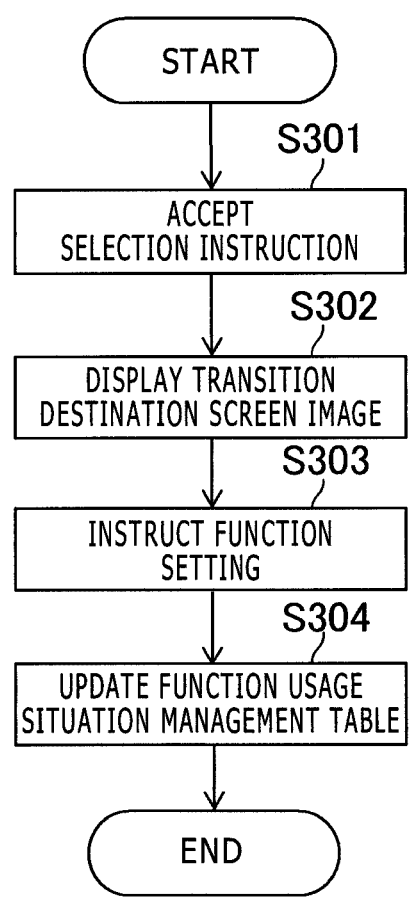
FIG. 13 is a flow chart illustrating an example of a function setting process executed by the game apparatus according to the embodiment.

Now, a function setting process executed by the game apparatus 10 according to the present embodiment is described with reference to a flow chart of FIG. 13.

Here, a process performed when a message image 260A or another message image 260B is selectively indicated by a user in a state in which such a top screen image 200 as depicted in FIG. 9 or FIG. 10 is displayed by the message image displaying process or performed when one of the list items 322 is selectively indicated by a user in a state in which such an announcement screen image 300 as depicted in FIG. 12 is displayed by the message list displaying process is described.

First, if the operation acceptance unit 31 accepts a selection instruction of the message image 260A, the message image 260B or a list item 322 by the user (S301), the display controlling unit 32 displays a transition destination screen image indicated by a transition destination link associated with the displaying contents indicated by the selected message image 260A, the message image 260B or the list item 322 (S302).

Figure 14:
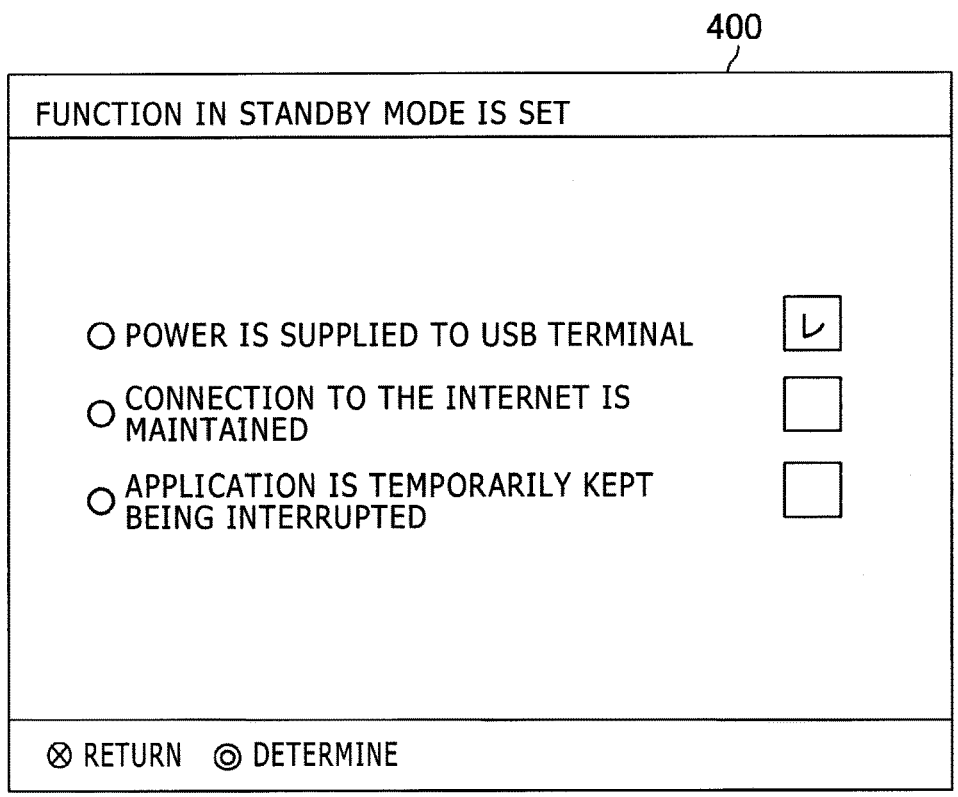
FIG. 14 is a view depicting an example of a transition destination screen image displayed on the display unit according to the embodiment.

FIG. 14 is a view depicting an example of a transition destination screen image displayed on the displaying unit 16 according to the present embodiment. FIG. 14 depicts a transition destination screen image 400 when the message image 260A or a list items 322 having displaying contents of "application can be temporarily kept being interrupted during standby" is selectively indicated. As depicted in FIG. 14, a setting screen image for setting a function in a standby mode is displayed as the transition destination screen image 400. Here, since the user has invalidated setting of the function of "application can be temporarily kept being interrupted during standby," a message for announcing the current function is displayed on the top screen image 200. Accordingly, since a setting screen image on which setting of the function "application can be temporarily kept being interrupted during standby" can be performed is displayed as the transition destination screen image 400, setting of the function is urged to the user. Here, while the setting screen image on which setting of the function indicated by the displaying contents of the message image 260A or the list item 322 can be performed is displayed as the transition destination screen image 400, the present invention is not limited to this. For example, a screen image on which detailed description of the function indicated by the displaying contents of the message image 260A or the list items 322 is displayed or another screen image on which a displaying method for a setting screen image for setting the function is described may be displayed as the transition destination screen image 400.

Then, if the user performs a setting indication of one of functions in a state in which the transition destination screen image 400 depicted in FIG. 14 is displayed (S303), the function usage situation management table Tbl200 stored in the storage unit 12 is updated in response to the setting instruction of the function by the user (S304), thereby ending the function setting process.

Power Supply Operation Screen Image Displaying Process

A power supply function is available as one of functions provided in the game apparatus 10. Turning on/off of the power supply is a function used without fail when the game apparatus 10 is used, and it is desirable that, for such a frequently used function as just described, information particularly suitable for each user can be presented. Therefore, information suitable for a user is presented in response to a usage situation of a function by each user on a power supply operation screen image for using the power supply function. Details of the power supply operation screen image are described below.

Figure 15A:
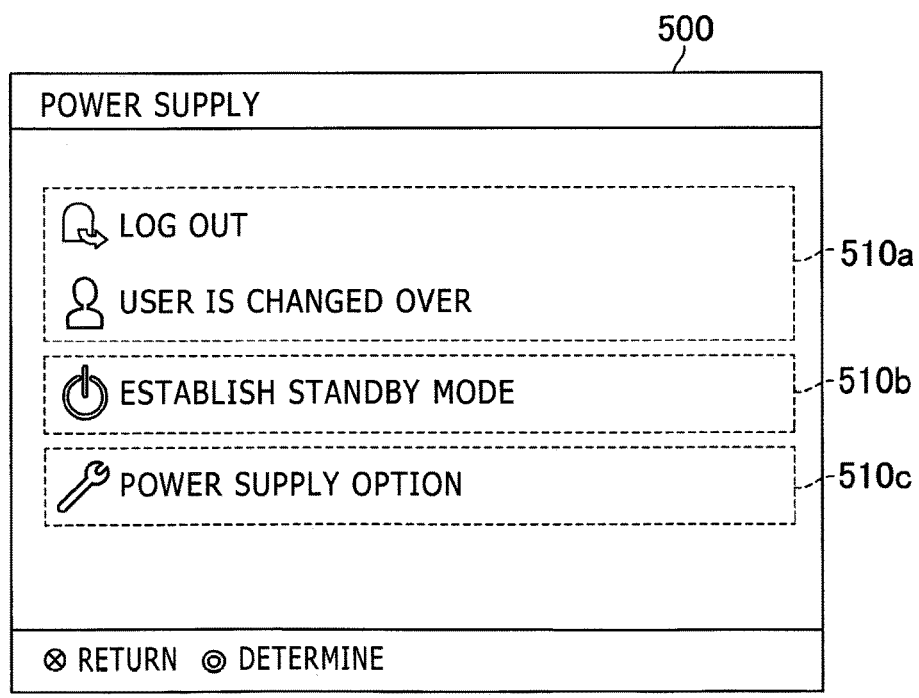
FIG. 15A is a view depicting an example of a power supply function setting screen image displayed on the display unit according to the embodiment.
Figure 15B:
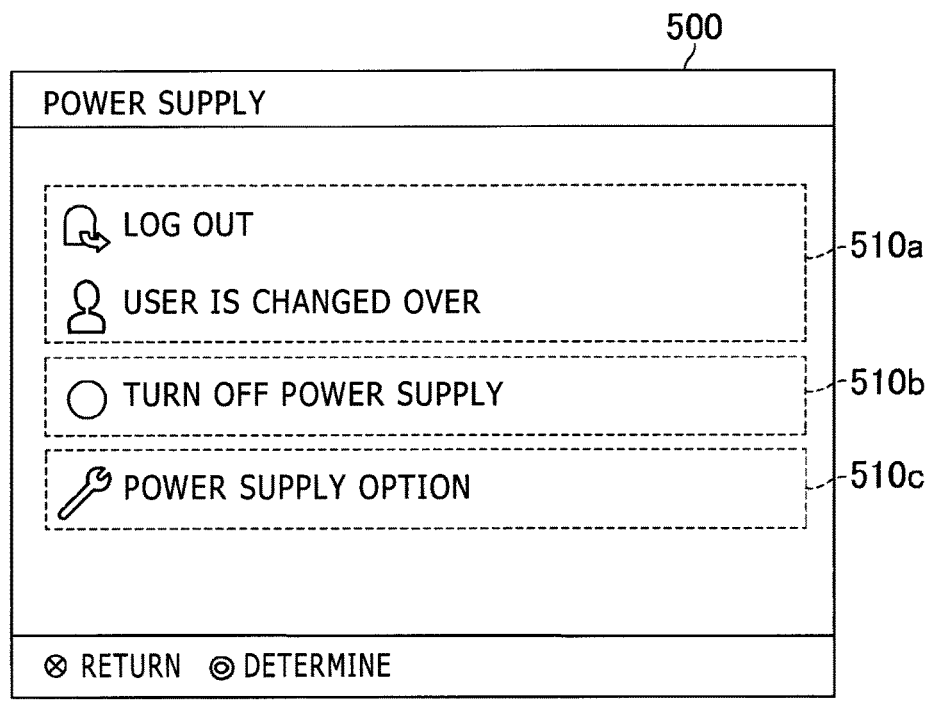
FIG. 15B is a view depicting another example of a power supply function setting screen image displayed on the display unit according to the embodiment.

FIG. 15A and FIG. 15B are views depicting examples of a power supply operation screen image displayed on the displaying unit 16 according to the present embodiment. As depicted in FIG. 15, a power supply operation screen image 500 according to the present embodiment is configured by including a plurality of operation image items 510 (510a, 510b and 510c). The operation image item 510a is an item for selecting a power supply function A, and the power supply function A is executed by selectively operating the operation image item 501a. An image indicating the power supply function A displayed in the operation image item 510a is invariable, for example, an image indicating a power supply function such as "log out" or "user is changed over" is always displayed. That is to say, the user may display the power supply operation screen image in order to cause the power supply function A to be executed. The operation image item 510b is an item for selecting the power supply function B, and the power supply function B is executed by selectively operating the operation image item 510b. An image indicating the power supply function B displayed in the operation image item 510b is changed over in response to the usage situation of a specific function, and one of images from among images indicating a plurality of power supply functions of displaying candidates is displayed in response to the usage situation of a specific function. In the present embodiment, an image indicating a power supply function of "establish standby mode" and another image indicating a power supply function of "turn off power supply" are displayed exchangeably in response to the usage situation of a specific function. FIG. 15A depicts a power supply operation screen image on which an image indicating the power supply function of "establish standby mode" is displayed in the operation image item 510b. Further, FIG. 15B depicts a power supply operation screen image on which an image indicating the power supply function of "turn off power supply" is displayed in the operation image item 510b. An operation screen image item 510c is an item for selecting a power supply option. The power supply option indicates other power supply functions that are not displayed in the operation image item 510a and the operation image item 510b, and if a selection operation of the operation image item 510c is performed, a power supply option operation screen image for selecting a different power supply function is displayed.

Figure 16:
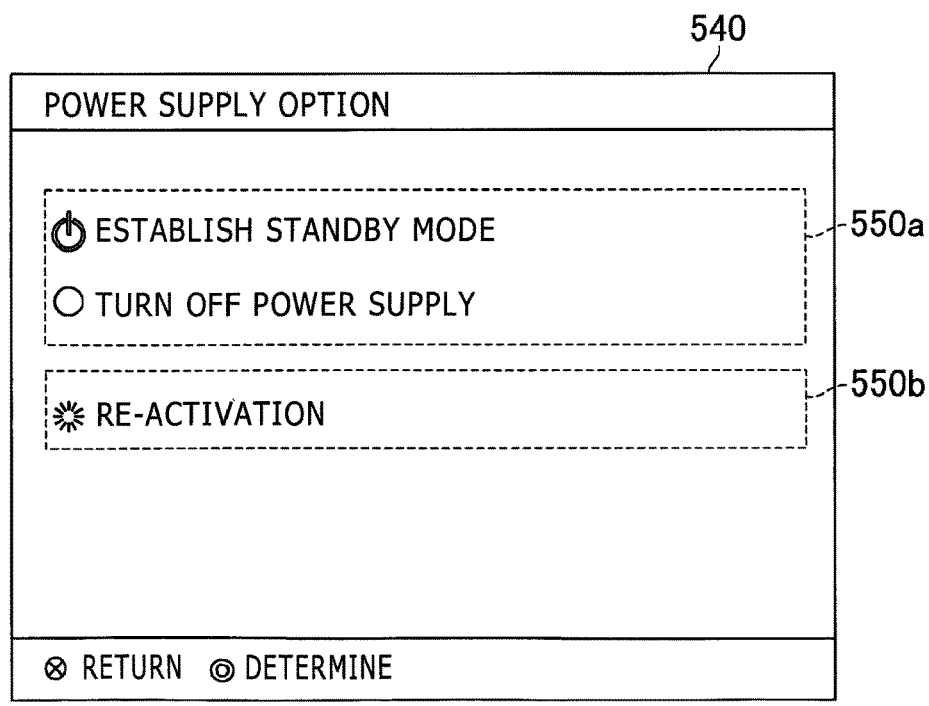
FIG. 16 is a view depicting an example of a power supply option setting screen image displayed on the display unit according to the embodiment.

FIG. 16 is a view depicting an example of a power supply option operation screen image displayed on the displaying unit 16 according to the present embodiment. A power supply option operation screen image 540 depicted in FIG. 16 is displayed by performing selective operation of the operation image item 510c depicted in FIG. 15A and FIG. 15B. Here, it is assumed that the same power supply option operation screen image is displayed even if the operation image item 510c depicted in FIG. 15A is selectively operated or even if the operation image item 510c depicted in FIG. 15B is selectively operated. As depicted in FIG. 16, the power supply option operation screen image 540 according to the present embodiment is configured by including a plurality of operation image items 550 (550a and 550b). In the operation image item 550a, an image indicating the power supply function B of all displaying candidates capable of being displayed in the operation image item 510b depicted in FIG. 15A and FIG. 15B is displayed. In the operation image item 550a, execution of a different power supply function B that is not indicated in the operation image item 510b of the power supply operation screen image 500 can be selected. In particular, as depicted in FIG. 16, an image indicating the power supply function of "establish standby mode" and another image of the power supply function of "turn off power supply" that are images indicating the power supply functions B of the displaying candidates capable of being displayed in the operation image item 510*b* in FIG. 15A and FIG. 15B are displayed in the operation image item 550*a*. It is to be noted that, in FIG. 16, although an example in which an image indicating all power supply functions B of the displaying candidates capable of being displayed in the operation image item 510*b* is displayed in the operation image item 550*a*, only an image indicating a power supply function that is not displayed in the operation image item 510*b* from among the power supply functions B of the displaying candidates may be displayed. Further, in the operation image item 550*b*, an image indicating a different power supply function that is not displayed in the power supply operation screen image 500 depicted in FIG. 15A and FIG. 15B is displayed, and, for example, an image indicating a power supply function of "re-activation" is displayed.

In this manner, a power supply function frequently used by a user is set so as to be capable of being selectively executed on the power supply operation screen image 500 while a power supply function used occasionally is set so as to be capable of being selectively executed on a power supply option operation screen image. Consequently, it is facilitated for the user to use a power supply function that is used frequently.

Here, a process by which an image indicating power supply functions B of a plurality of displaying candidates capable of being displayed in the operation image item 510*b* is changed over in response to the usage situation of a specific function is described particularly. In the present embodiment, changeover is performed between an image indicating a power supply function of "establish standby mode" and another image indicating a power supply function of "turn off power supply" that are images indicating the power supply functions B of the displaying candidates. Changeover between the displaying of the images indicating these two power supply functions is performed in response to the usage situation of "function in standby mode." In particular, where at least one of a plurality of setting items is set valid in the setting screen image depicted in FIG. 14 for setting a function in the standby mode, an image indicating the power supply function "establish standby mode" is displayed in the operation image item 510*b*. Further, where all of the plurality of setting items are set invalid in the setting screen image depicted in FIG. 14 for setting a function in the standby mode, an image indicating the power supply function of "turn off power supply" is displayed in the operation image item 510*b*. Here, where at least one of settings of the functions in the standby mode is valid, it is supposed that the power supply function of "establish standby mode" is selected when the user ends utilization of the game apparatus 10. Further, where all of settings of the functions in the standby mode are set invalid, it is supposed that the power supply function of "turn off power supply" is selected when the user ends utilization of the game apparatus 10. Therefore, the image to be displayed in the operation image item 510*b* is changed over as described above in response to the usage situation of the function in the standby mode. Consequently, a power supply operation screen image suitable for a usage situation of a function by a user can be presented to the user and it is facilitated for the user to execute a power supply function that is used frequently.

Here, a power supply operation screen image displaying process executed by the game apparatus 10 according to the present embodiment is described with reference to a flow chart of FIG. 17.

First, if the operation acceptance unit 31 accepts an operation instruction for displaying a power supply operation screen image (S401), the function use information acquisition unit 34 acquires function use information corresponding to a user identifier included in the operation instruction from the function usage situation management table Tbl200 (S402). Here, the function use information acquisition unit 34 acquires information regarding "function in standby mode" from the function usage situation management table Tbl200 as the function use information.

Then, the condition decision unit 33 decides whether or not at least one of setting items included in "function in standby mode" is valid (S403).

If it is decided as a result of the decision in the process S403 that at least one of the setting items included in "function in standby mode" is valid (S403: Y), the display controlling unit 32 causes an image indicating the power supply function of "establish standby mode" to be displayed in the operation image item 510*b* of the power supply operation screen image as illustrated in FIG. 15A (S404). On the other hand, if it is decided as a result of the decision in the process S403 that all of the setting items included in "function in standby mode" are invalid (S403: N), the display controlling unit 32 causes the power supply function of "turn off power supply" to be displayed in the operation image item 510*b* of the power supply operation screen image as illustrated in FIG. 15B.

Further, it is especially effective to display, in the game apparatus 10 that can display such a power supply operation screen image as described above, a message image regarding the power supply operation screen image displaying process in response to a usage situation of a power supply function of the user. In particular, if the user by whom at least one of setting items included in the functions in the standby mode is set valid selects and executes the power supply function of "turn off power supply" from within the operation image item 550*a* of the power supply option operation screen image, a message image of displaying contents of "power supply option that is used frequently can be accessed simply." Then, if all of the setting items included in the functions in the standby mode are all invalidated on a screen image of the transition destination, it is announced that an image indicating the power supply function of "turn off power supply" is displayed on the power supply operation screen image. Consequently, it is possible to announce the power supply operation screen image displaying process at a suitable timing not only to a user by whom setting of a function in the standby mode is set valid although this is not necessary but also to a user who does not know the power supply operation screen image displaying process.

Further, a message image may be displayed taking a frequency into consideration in which a user by whom at least one of the setting items included in the functions in the standby mode selects and executes the power supply function of "turn off power supply" from within the operation image item 550*a* of the power supply option operation screen image. In particular, a user by whom the frequency in which the power supply function of "turn off power supply" from within the operation image item 550*a* of the power supply option operation screen image is selected and executed is high may have the possibility that setting of a function in the standby mode may be set valid although this is not necessary. However, it is considered that, although a user by whom the frequency in which the power supply function of "turn off power supply" is selected and executed from within the operation image item 550*a* of the power supply option operation screen image is low usually executes the standby mode, the user occasionally turns off the power supply intentionally. Therefore, if a message image is displayed for the user by whom the frequency in which the power supply function of "turn off power supply" from within the operation image item 550a of the power supply option operation screen image is selected and executed is high but is not displayed for the user by whom the frequency in which the power supply function of "turn off power supply" is selected and executed from within the operation image item 550a of the power supply option operation screen image is low, a message image for announcing an appropriate power supply function according to a usage situation of a function by a user can be presented.

The invention claimed is:

1. A game apparatus, comprising:
  a memory that stores a program;
  a processor that is configured to execute the program stored in the memory to:
    manage a usage situation of a function, the usage situation of the function showing a plurality of functions in relation to previously given instructions by a user in the game apparatus;
    decide, in response to an instruction by the user, whether or not each of a plurality of messages is to be displayed based on the instruction and the usage situation of the function, each of the plurality of messages being associated with each of the plurality of functions shown in the usage situation of the function, respectively;
    produce a message list in which the plurality of messages decided so as to be displayed are placed in response to the instruction;
    cause a selected one of the plurality of messages, which are decided so as to be displayed, to be displayed; and
    display a message list image indicating the message list in according with a displaying instruction of the message list by the user after the selected message is displayed.

2. The game apparatus according to claim 1, wherein, when the processor decides that the function stored in an associated relationship with the instruction is not used, the processor causes a message regarding the function to be displayed in response to the instruction by the user.

3. The game apparatus according to claim 1, wherein
  the processor causes, from among the plurality of messages decided as to be displayed in response to the instruction by the user, one of the messages that have not been displayed to be displayed in response to a next instruction by the user.

4. The game apparatus according to claim 1, wherein
  the processor places the messages in an order in which the processor decides to display the messages in response to the instruction by the user.

5. The game apparatus according to claim 1, wherein:
  the processor further displays, in response to selection indication of one of the displayed messages by the user, a transition screen image in which information regarding a function indicated by the message is indicated.

6. The game apparatus according to claim 1, wherein
  the processor manages a respective usage situation of a function provided in the game apparatus for each of a plurality of users who use the game apparatus, and
  the processor decides, in response to an instruction by each of the plurality of users, whether or not a message relating to the function shown in the respective usage situation of the function to be displayed based on the instruction by each of the plurality of users and the respective usage situation of the function.

7. A controlling method for a game apparatus, the method being performed by a processor in the game apparatus executing a program stored in a memory in the game apparatus, the method comprising:
  managing a usage situation of a function, the usage situation of the function showing a plurality of functions in relation to previously given instructions by a user in the name apparatus;
  deciding, in response to an instruction by the user, whether or not each of a plurality of messages is to be displayed based on the instruction and the usage situation of the function, each of the plurality of messages being associated with each of the plurality of functions shown in the usage situation of the function, respectively;
  producing a message list in which the plurality of messages decided so as to be displayed are placed in response to the instruction;
  causing one of the plurality of messages, which are decided so as to be displayed, to be displayed in response to the instruction; and
  displaying a message list image indicating the message list in according with a displaying instruction of the message list by the user after the selected message is displayed.

8. A non-transitory computer-readable storage medium that stores a computer-executable program for game apparatus, the program comprising instructions for:
  managing a usage situation of a function, the usage situation of the function showing a plurality of functions in relation to previously given instructions by a user in the game apparatus;
  deciding, in response to an instruction by the user, whether or not each of a plurality of messages is to be displayed based on the instruction and the usage situation of the function, each of the plurality of messages being associated with each of the plurality of functions shown in the usage situation of the function, respectively;
  producing a message list in which the plurality of messages decided so as to be displayed are placed in response to the instruction;
  causing one of the plurality of messages, which are decided so as to be displayed, to be displayed in response to the instruction; and
  displaying a message list image indicating the message list in according with a displaying instruction of the message list by the user after the selected message is displayed.

* * * * *